No. 825,147. PATENTED JULY 3, 1906.
D. H. MOSTELLER.
ICE CREAM SPOON.
APPLICATION FILED FEB. 5, 1906.
2 SHEETS—SHEET 1.
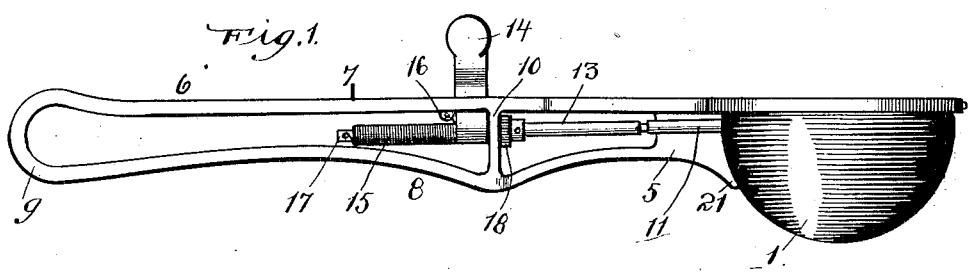
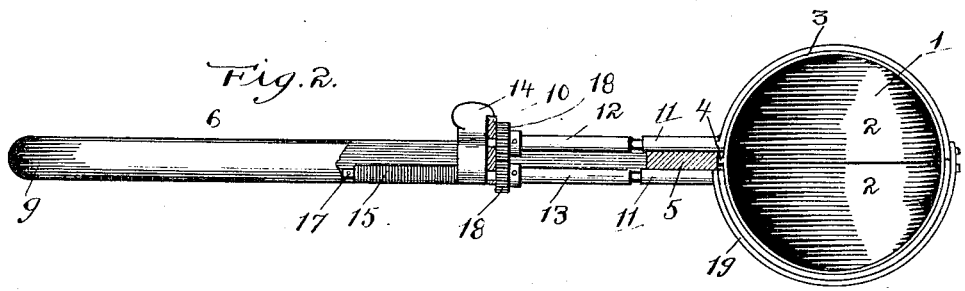
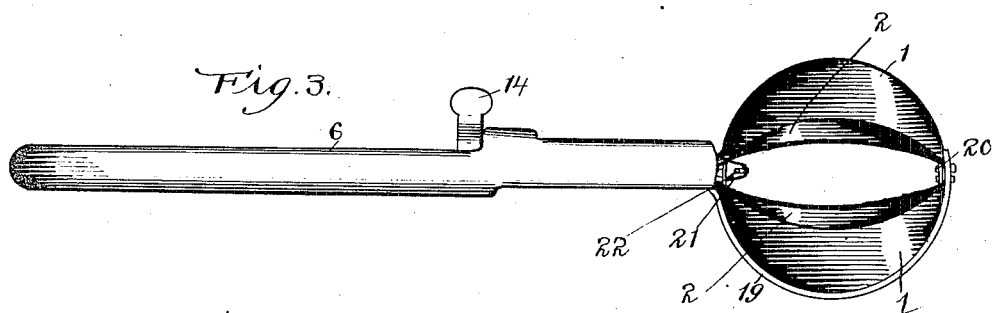
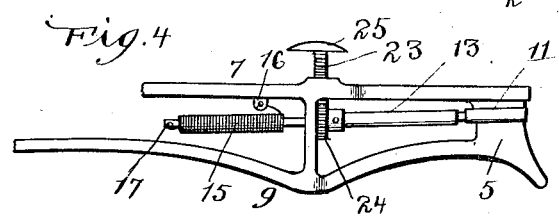
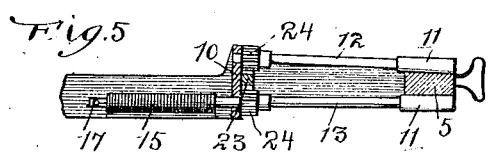
Witnesses:
Wm. P. Bond
Frances M. Frost
Inventor:
Dosier H. Mosteller
By Banning & Banning
Attorneys No. 825,147. PATENTED JULY 3, 1906.
D. H. MOSTELLER.
ICE CREAM SPOON.
APPLICATION FILED FEB. 5, 1906.
2 SHEETS—SHEET 2.
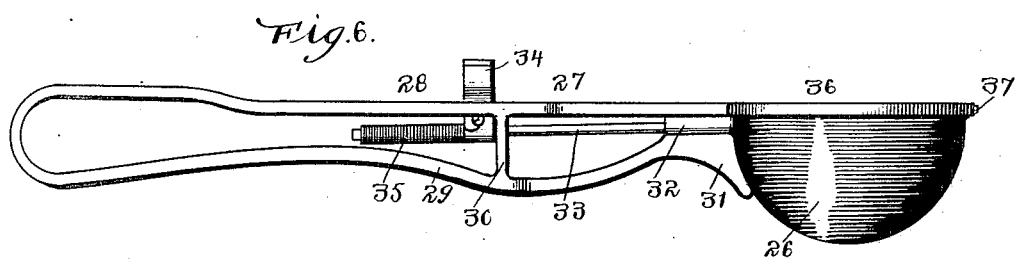
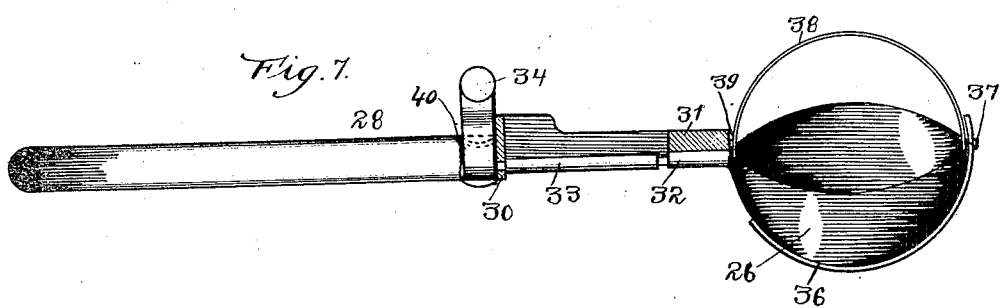
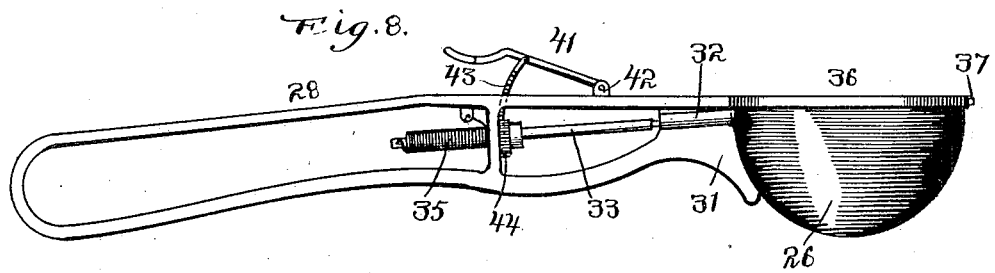
Witnesses:
Wm P. Bond
Frances M. Frost
Inventor:
Dosier H. Mosteller
By
Banning & Banning
Attorneys

UNITED STATES PATENT OFFICE.

DOSIER H. MOSTELLER, OF CHICAGO, ILLINOIS, ASSIGNOR TO THE MOSTELLER MANUFACTURING COMPANY, OF CHICAGO, ILLINOIS, A CORPORATION OF ILLINOIS.

ICE-CREAM SPOON.

No. 825,147.   Specification of Letters Patent.   Patented July 3, 1906.

Application filed February 5, 1906. Serial No. 299,540.

*To all whom it may concern:*

Be it known that I, DOSIER H. MOSTELLER, a citizen of the United States, residing at Chicago, in the county of Cook and State of Illinois, have invented certain new and useful Improvements in Ice-Cream Spoons, of which the following is a specification.

In the dishing out of ice-cream difficulty is always experienced in releasing the cream from the bowl of the spoon, and various expedients have been adopted from time to time in order to produce this result.

The present invention has for its object the construction of a spoon adapted to be used in the ordinary manner, which is provided with a scraper and a movable bowl which enables the ice-cream to be quickly and easily released from the bowl in the form of a perfect rounded block and is adapted to be operated by one hand, thus leaving the other hand free for releasing the lid of the receptacle within which the ice-cream is contained.

Another object of the invention is to so arrange the parts that the operation of the movable bowl can be easily, quickly, and conveniently performed without tiring the hand and in a much more perfect and rapid manner than has hitherto been the case.

The invention consists in the features of construction and combination of parts hereinafter described and claimed.

In the drawings, Figure 1 is a side elevation of the spoon in normal position; Fig. 2, a top or plan view of the same, showing the handle partially open; Fig. 3, a view showing the bowl thereof partly open; Figs. 4 and 5, detail views of a slightly-modified form of operating mechanism; Fig. 6, a side elevation of the spoon having an integral bowl; Fig. 7, a top or plan view of the same, showing the bowl turned out of normal position; and Fig. 8, a slightly-modified form of operating mechanism.

The spoon of Fig. 1 consists of a bowl 1 of hemispherical shape consisting of two sections 2, which when in normal position have their edges in close abutment against each other and form, in effect, a complete bowl. Within the closed bowl is a scraper-ring 3, to the opposite sides of which the sections of the bowl are pivoted for allowing the bowl to be swung from the position shown in Fig. 2 to the position shown in Fig. 3. The scraper-ring is connected by means of a neck 4 with a handle-head 5, from which extends the handle 6. The handle is composed of an outer bar 7, a lower bar 8, a connecting end 9, and a cross-wall 10 and is of suitable formation to rest easily and conveniently within the hand of the user. The handle 15 serves as a bearing for oppositely-disposed bearing-studs 11, which terminate in rods 12 and 13, which are journaled at their inner ends in the cross-wall 10, and the rod 13 extends through the cross-wall and has mounted thereon a thumb-lever 14, and the rod is further provided with a coil-spring 15, which has one end secured within a lug 16 and its opposite end passed through the rearwardly-projecting end of the rod. The two rods are provided with intermeshing pinions 18 immediately forward of the cross-wall, so that the movement of one of the rods is imparted in a reverse direction to the other rod. In order to strengthen the device and enable the bowl and scraper-ring to be made of thin material, an outer reinforcing half-ring 19 is provided, which at its inner end is secured to the handle-head 5 and has pivoting-studs 20 passed through its outer end and through the fixed scraper-ring for pivoting the outer tapered ends of the segmental sections of the bowl. The head is provided with a depending tongue 21, which has outwardly-projecting therefrom a pin or stud 22, which serves as a stud or abutment for preventing the inner edges of the closing bowl-sections from being injured by abrupt contact with one another.

The operating mechanism of Figs. 4 and 5 is similar in every respect to that hitherto described, with the exception that in place of the thumb-lever a thumb-rack 23 is employed, which is slidably mounted between pinions 24, which instead of intermeshing with each other mesh with the oppositely-disposed teeth of the thumb-rack, which latter projects through the upper bar 7 and is provided on its end with a thumb-button 25, adapted to depress the rack against the tension of the coil-spring 15. The modified form of mechanism shown in Figs. 4 and 5 is similar in every respect to that hitherto described.

In using the spoon of either of the forms hitherto described the ice-cream is dipped up in the usual manner, forming a hemispherical block within the closed bowl. When it is desired to discharge the cream from the bowl, the thumb-lever or thumb-button is moved to revolve the pinions in opposite directions, and thereby rotate the rods which actuate the segmental sections of the bowl. The sections of the bowl will be moved from the position shown in Fig. 1 to a reverse position, in which the normally upper edges of the bowl-sections are brought into contact, which allows the scraper-ring to act upon the block of ice-cream contained within the bowl, discharging the block as the bowl-sections are opened, and this discharge is made without turning the spoon as a whole upside down and without changing its position in the hand. The thumb lever or button is suitably located to allow the shank of the handle to be readily grasped by the fingers of the user, leaving the thumb thereon for the operation of the button or lever. As shown in Figs. 2 and 3, the upper part of the handle is suitably formed to allow wide swing for the lever. When the lever or button is released, the tension of the spring immediately throws back the sections of the bowl into normal position preparatory to further use, and the tension of the spring is sufficient to prevent any accidental distention of the bowl-sections as the ice-cream is being dished out.

In Figs. 6 and 7 a slightly-modified form of construction is shown, in which an integral bowl is employed in place of a divided bowl, though in most respects the two devices are similar. In the device of Figs. 6 and 7, 26 represents the integral bowl which, like the divided bowl, is of hemispherical shape, and it is secured to a handle 27, having upper and lower parts 28 and 29, a cross-wall 30, and a head 31, which serves as a mounting for a bearing-stud 32, connecting with a rod 33, which passes through a cross-wall 30 and has mounted thereon a finger-lever 34 and a coil-spring 35, similar to that hitherto described. The head 31 has outwardly extending therefrom a reinforcing half-ring 36, to the outer end of which the bowl is pivoted by means of a pivot-pin 37, and within the bowl is a circular scraper-ring 38, connected, by means of a neck 39, to the head 31. The upper rail 28 of the handle is provided with a recess 40, which allows a wide swing of the thumb-lever, which is necessary in moving the bowl through a half-revolution for discharging the ice-cream.

The spoon of Fig. 8 employs in place of the finger-lever 34 a depressible lever 41, pivoted between ears 42 and connected with a curved rack 43, meshing with a pinion 44, which operates the rod 33 in the same manner as the finger-lever 34 of Figs. 6 and 7.

The spoon of Figs. 6, 7, and 8 operates in the same manner as the spoon hitherto described, discharging the block of ice-cream by the action of the fixed scraper which cuts out the block of ice-cream from the moving bowl; but in the construction of Figs. 6 and 7 it is of course necessary to move the bowl through half an entire revolution, whereas in the spoon for the divided bowl a quarter-revolution is sufficient.

It will be seen from the foregoing description that the spoon of either form of the present invention is adapted to be operated with great ease and rapidity, discharging the contained block of ice-cream without mussing, fraying, or breaking it up, which method of discharging the cream not only results in a neater-looking block of ice-cream being served to the consumer, but prevents the rapid melting of the ice-cream, which will occur if small pieces or fragments are scattered upon the dish, which of course will melt much more rapidly than a single integral block. The ease and rapidity with which the spoon of the present invention can be operated makes it specially useful in ice-cream parlors, soda-fountains, and similar establishments where a large number of persons must be served in a very short time, and a further advantage pertaining to the present invention is that the quantity of ice-cream served to each customer will be the same, which is not the case where spoons of the ordinary style are used. This uniformity of distribution results in a considerable saving and obviates dissatisfaction and enables the proprietor to determine in advance just how many dishes of ice-cream are contained within a can of known capacity.

Although the operating mechanism of the present invention has been described with considerable detail, it is obvious that some of the mechanical features herein described can be modified without departing from the spirit of the invention, which consists, essentially, in the employment of a movable bowl in connection with a fixed scraper.

The above device has been described as an ice-cream spoon; but it is obvious that it might be used for dishing out other substances of similar nature or for any other purpose for which it is adapted.

What I claim as new, and desire to secure by Letters Patent, is—

1. In an ice-cream spoon, the combination of a handle, a bowl movably mounted thereon, and a scraper within the bowl rigidly secured to the handle as and for the purposes set forth.

2. In an ice-cream spoon, the combination of a handle, a bowl rotatably mounted with respect to the handle, a scraper fixedly mounted with respect to the handle, and means for rotating the bowl, substantially as described.

3. In an ice-cream spoon, the combination of a handle, a bowl rotatably mounted with respect to the handle, a scraper fixedly mounted with respect to the handle, a mechanism secured to the handle and adapted to be operated by the thumb of the user for rotating the bowl, substantially as described.

4. In an ice-cream spoon, the combination of a handle, a round bowl rotatably mounted with respect thereto, a rod connected with the bowl, means for revolving the rod, and a fixed scraper within the bowl, substantially as described.

5. In an ice-cream spoon, the combination of a handle, a round bowl rotatably mounted with respect thereto, a rod connected with the bowl, means for revolving the rod, and a fixed scraper-ring closely adjacent to the interior of the bowl for cutting out the ice-cream therein contained, substantially as described.

6. In an ice-cream spoon, the combination of a handle, a bowl rotatably mounted with respect to the handle, a rearwardly-extending rod journaled within the handle and adapted to move the bowl, a thumb-lever on the rod, a spring adapted to return the rod to normal position, and a fixed scraper closely adjacent to the interior of the bowl for cutting out the ice-cream therein contained, substantially as described.

7. An ice-cream spoon, consisting of a rounded bowl comprising two segmental sections, rods rearwardly extending from the sections, a handle within which the rods are journaled, a scraper-ring within the bowl fixedly secured to the handle, and means for rotating the rods to move the bowl-sections in opposite directions and around the scraper-ring, substantially as described.

8. An ice-cream spoon, consisting of a rounded bowl comprising two segmental sections, rods rearwardly extending from the sections, a handle within which the rods are journaled, a scraper-ring within the bowl fixedly secured to the handle, pinions on the rods, and means for moving the pinions in opposite directions to discharge the ice-cream, substantially as described.

9. An ice-cream spoon consisting of a rounded bowl comprising two segmental sections, rods rearwardly extending from the two sections, intermeshing gear-pinions on the rods, a handle within which the rods are journaled, a coil-spring surrounding one of the rods and adapted to return it to normal position, a thumb-lever for operating one of the rods, and a scraper-ring within the bowl for cutting out the ice-cream therein contained, substantially as described.

10. An ice-cream spoon, consisting of a rounded bowl comprising two segmental sections, rods rearwardly extending from the two sections, intermeshing gear-pinions on the rods, a handle within which the rods are journaled, a coil-spring surrounding one of the rods and adapted to return it to normal position, a thumb-lever for operating one of the rods, a scraper-ring within the bowl for cutting out the ice-cream therein contained, and an exterior reinforcing-bar extending from the handle around the bowl to which bar the tapered outer ends of the segmental sections of the bowl are pivoted, substantially as described.

DOSIER H. MOSTELLER.

Witnesses:
WALKER BANNING,
OSCAR W. BOND.